United States Patent
Maki et al.

(10) Patent No.: US 6,390,621 B1
(45) Date of Patent: May 21, 2002

(54) MANUFACTURING OF POSITIVE POWER OPHTHALMIC LENSES

(75) Inventors: Alan D. Maki, Chaska; Jeffrey L. VerMurlen, Brooklyn Park; David C. Olund, Stanchield, all of MN (US)

(73) Assignee: Vision-Ease Lens, Inc., Ramsey, MN (US)

( * ) Notice: Subject to any disclaimer, the term of this patent is extended or adjusted under 35 U.S.C. 154(b) by 0 days.

(21) Appl. No.: 09/580,162

(22) Filed: May 30, 2000

(51) Int. Cl.[7] .............................. G02C 7/02; G02C 7/06
(52) U.S. Cl. ........................ 351/159; 351/168; 351/161; 351/177; 264/2.5
(58) Field of Search ................................. 351/159, 161, 351/168, 177; 264/2.5

(56) References Cited

U.S. PATENT DOCUMENTS

| | | |
|---|---|---|
| 2,443,286 A | 6/1948 | Weston |
| 2,618,200 A | 11/1952 | Clave et al. |
| 4,008,031 A | 2/1977 | Weber |
| 4,091,057 A | 5/1978 | Weber |
| 4,364,878 A | 12/1982 | Laliberte et al. |
| 4,409,169 A | 10/1983 | Bartholdsten et al. |
| 4,442,061 A | 4/1984 | Matsuda et al. |
| 4,519,763 A | 5/1985 | Matsuda et al. |
| 4,645,317 A | 2/1987 | Frieder et al. |
| 4,781,452 A | 11/1988 | Ace |
| 4,828,769 A | 5/1989 | Maus et al. |
| 4,839,110 A | 6/1989 | Kingsbury |
| 4,867,553 A | 9/1989 | Frieder |
| 4,883,548 A | 11/1989 | Onoki |
| 4,892,403 A | 1/1990 | Merle |
| 4,927,480 A | 5/1990 | Vaughan |
| 4,969,729 A | 11/1990 | Merle |
| 5,214,453 A * | 5/1993 | Giovanzana ................. 351/161 |
| 5,288,221 A | 2/1994 | Stoerr et al. |
| 5,336,261 A * | 8/1994 | Barrett et al. ................... 623/5 |
| 5,433,810 A | 7/1995 | Abrams |

* cited by examiner

*Primary Examiner*—Scott J. Sugarman
(74) *Attorney, Agent, or Firm*—Mark A. Litman & Assoc. P.A.

(57) ABSTRACT

Multifocal ophthalmic lenses may be manufactured by either injection molding and casting methodologies. The use of two opposed tools (mold faces) with relatively centered faces, but with significantly differing diameters can be used to provide multifocal ophthalmic lenses. The process is surprisingly capable of providing multifocal lenses with good control of the thickness of the lenses, with relatively thin center thicknesses (e.g., less than 4.7 mm, or less than 3.5 mm) and relatively thin edge thicknesses (e.g., 0.5 to 2.5 or to 2.0 mm). The tool faces (the molds for the front and rear surfaces) may be readily replaced within the mold to enable manufacture of a wide range of lens prescriptions with minimum down time.

17 Claims, 3 Drawing Sheets

80 mm Front and 65 mm Back Tooling
2.84 Center Thickness,
Results in 1.00 mm Thinnest Point Molding of Plus Power Ophthalmic Lenses
Lens Design 80 mm Front and Back Tooling
2.84 Center Thickness, Results in
Tool Interference at Outer Diameter

MANUFACTURING OF POSITIVE POWER OPHTHALMIC LENSES

BACKGROUND OF THE INVENTION

1. Field of the Invention

In casting and molding processes in general, front surface and back surface dies are used to impart to the plastic material the optical surfaces appropriate for the desired ophthalmic correction. In casting processes in general, the dies are secured together by a gasket or the like at a desired spacing, and a liquid casting material is introduced in the casting cavity defined thereby, and allowed to cure and harden into a lens. A critical factor is the gasket, and that a large plurality of gaskets are required to accommodate and seal with the large plurality of differing optical surfaces of the various dies while also defining the desired die spacing (and lens thickness). Thus a large capital investment is required in gaskets and gasket tooling, as well as in the optical surface forming dies used in the casting process.

2. Background of the Art

In molding processes in general, more rugged dies are employed to compress a moldable material in a closed molding cavity, impressing the optical surface configurations on the material as the material is hardened by thermal or chemical means. Generally speaking, an excess of molding material must be introduced into the cavity to allow for compressive die movement, and means must be provided to vent the excess material from the cavity and accommodate the sprues formed thereby. Also, as in the casting process, the dies must be urged together to the appropriate spacing to create the desired lens thickness. The amount of molding material, the venting of excess material, and the final thickness of the lens are interrelated factors that require precise process control to produce lenses of high quality for ophthalmic use.

U.S. Pat. No. 4,839,110 describes a process for molding or casting ophthalmic lenses in which the apparatus includes a plurality of front surface and back surface dies having differing optical forming surfaces and identical peripheral edge configurations. In the compression molding process, any pair of front surface and back surface dies are received in sliding, sealing fashion in the bore of the molding apparatus. At least one of the pair of dies is provided with at least one ,ate channel formed in the peripheral edge thereof parallel to the axis of the bore and extending from the optical forming surface to a point adjacent to the opposite, external die surface. The gate channel comprises a vent through which excess molding compound is discharged from the molding cavity as the dies are urged together. As the gated die is fully inserted in the bore, the gate channel opening to the exterior is sealed by the bore surface, thus terminating the discharge effect and retaining a predetermined amount of molding material in the molding cavity. The molding material is then solidified by thermal or chemical reaction to form the finished lens. Thus the invention provides intrinsic control of the thickness of the molded part, while also providing positive venting of excess molding material. In the casting, process, the dies are partially inserted in the bore of a casting in sliding, sealing fashion, and the gate channel serves as an injection channel to introduce the casting compound into the casting cavity. The dies are urged together in the bore, the gate channel first serving to vent excess casting compound and gas from the casting cavity. Full die insertion in the bore causes the gate channel opening, to the exterior to be sealed by the bore wall, thus terminating the discharge effect and retaining a predetermined amount of casting material in the casting cavity. The material is then cured or hardened by thermal or chemical reaction to form the finished lens. Thus the invention also provides intrinsic control of the thickness of the cast part, while also permitting easy filling of the casting cavity and venting of excess material and gas from the vent cavity.

U.S. Pat. No. 5,288,221 describes an alternative method of preparing an ophthalmic lens comprising a process wherein a premanufactured polymeric lens or lens wafer is employed as one of two molds required to produce the finished lens. A conventional glass, plastic, ceramic, or metal mold is employed as the second mold, a polymerizable lens material is injected between said two molds, and the relative positions of said two molds are adjusted as required by the prescription to produce the finished lens. The polymerizable lens material and the premanufactured lens or lens wafer adhere to one another through a combination of mechanical and chemical bonding. The joined lens material and the lens wafer are then removed from the glass, plastic, ceramic, or metal mold. In this manner, one of the two molds used to make the lens is incorporated into the lens and becomes an integral part thereof. The respective orientation of the two molds is prepared by a pair of indexing means. The indexing means control the position of one of the two molds while the other mold is held in a fixed position. A first indexing means controls the rotational relationship between the molds and a second indexing means controls the spatial relationship between them. An indicator associated with the first indexing means indicates the angular position of the movable mold on a real time basis and an indicator associated with the second indexing means similarly indicates the instantaneous spatial relationship between the two molds so that the shape and thickness of the polymerizable material between the molds is continuously known; this enables the eye care professional to adjust the indexing means as needed.

Although the above-identified semi-finished lens manufacturing processes are of the types of manufacturing processes that have been commercially successful over the years, there are definite limitations to their utility. These manufacturing processes have been used to manufacture monofocal lenses for a number of reasons. One reason is that processes require significant modification to exchange either one of the lens mold surfaces. This is important because any multifocal lens must have a unique combination of both of the corrective functions of the multifocal lens. Both the cylinder and the diopter of the product must be matched to a specific prescription. As there are many combinations of prescriptions in the public, it has been considered too time consuming to manufacture a full range of prescriptions, particularly with the time delays in changing mold elements within the molding process. Additionally, the molding processes, with their mated diameter mold faces have not been able to control edge thicknesses easily and/or tend to place stress in the ends of the manufactured lenses in injection molding processes which lead to potential physical stresses in the final lens that can result in stress to the plastic under extreme ambient conditions. This is in spite of the fact that numerous alternative processes have been developed for injection molding.

Illustrative of these problems in the context of optical disk molding is Bartholdsten et al (U.S. Pat. No. 4,409,169), which teaches the need for a slow (up to 3 seconds), low-pressure injection of an oversized shot into a partially-open (air gap) mold parting line, then providing for deliberate melt cooling and viscosity-thickening, followed by a short pressing stroke (typically $\frac{1}{5}$ to $\frac{1}{10}$ the disk's thickness, or 0.005–0.010 inch) which initially squeezes out of the reduced mold cavity volume the partially-cooled and viscous excess plastic, then as the pressing continues to the fully-closed parting line position (zero clearance), this radially-extruded overflow is pinched off and full clamping force is thereafter maintained for shrinkage compensation and to assure no prerelease.

Another clamp-induced disk coining, process is disclosed in Matsuda et al (U.S. Pat. Nos. 4,442,061 and 4,519,763) wherein, into a slightly opened moldset, a melt is injected and cooled until fully solidified, then reheated till uniformly above the plastic's melt temperature, at which point clamp-actuated compressive stroke is conventionally delivered and maintained through this second cooling cycle. The energy efficiency and total cycle time of such a process are highly questionable.

Another type of molding process (termed an "auxiliary component" process for the sake of discussion) includes the use of auxiliary springs, cylinders or the like to apply a compressive force to the opposing optical surfaces and which compressive force means are commonly internal to the mold itself or as peripheral apparatus thereto. The primary difference between "auxiliary component" molding and clamp-end injection/compression, is that mold compression is provided by a stroke-producing element inherent to some injection molding machines (examples of same are the ejector or movable platen driving mechanisms such as the main clamp) in the latter whereas mold compression is provided by auxiliary springs or hydraulic cylinders, for example, in auxiliary component molding. Furthermore, clamp-end injection/compression motions tend to be inherently sequenced through and coordinated by the molding machines process control system, whereas auxiliary component compression tends to be controlled (if not self-action, like springs) separately by timers, etc., not supplied with the standard machine.

Early thermoplastic lens molding by these types of processes employed simple spring-loaded, movable optical dies within the moldset (Johnson, U.S. Pat. No. 2,443,286). Such apparatus created a variable-volume lens mold cavity thereby, but relied upon high internal polymer melt pressure to spread the movable dies against the resisting spring pressure. In order to apply sufficiently great compressive forces upon the solidifying mold contents, these spring forces were great. However, the greater the spring force, the greater the injection pressure that must be used to compress the springs during variable cavity fill. The greater the injection pressure required, the greater the degree of molded-in stresses and optically unsatisfactory briefringence. Of course, the greater the optical power for the molded lens, the greater the dissimilarity between the front and back curves and thus the greater the cross-sectional thickness variation. Also, the larger the lens diameter or the thinner the nominal lens thickness, the worse the center-to-edge thickness variations and the higher the degree of difficulty in preventing differential thermal shrinkage and resulting optical distortion to the finished lens. Therefore, processes of this type were generally limited in practice to production only of weakly powered lenses with minimal diameter and minimal thickness variations.

A subsequent auxiliary component process is represented by Weber (U.S. Pat. Nos. 4,008,031 and 4,091,057). This process uses a variable-volume lens mold cavity. Weber teaches a variable-volume cavity formed by injection-melt, pressure-induced rearward deflection (in one embodiment) of at least one movable male or female die, which after a certain interval is followed by forward displacement resulting in compression under the driving force of an auxiliary hydraulic cylinder mounted in one-to-one relationship with this movable die. Flow ports are provided through which excess increasingly-viscous, partially-cooled injected polymer melt is forcibly extruded from the lens cavity under the compressive forces. In operation, Weber teaches a mold fill of approximately 10 seconds. Also, as with conventional clamp-induced coining, Weber relies upon a preset amount of time to elapse between completion of injection fill and commencing compressive pressure. Accordingly, problems related to either premature compression (inadequate solidification) or excessively delayed compression (late solidification) could be encountered.

Still another similar process is represented by Laliberte (U.S. Pat. No. 4,364,878). Laliberte includes a movable die coupled to an auxiliary hydraulic cylinder. After the mold is closed under clamp pressure, the mating die parts are spread apart. A precise volumetrically-metered shot size of predetermined quantity just adequate to fill the fully-compressed mold-cavity-and-runner system is then injected. This control of shot size allows compression free of partly-solidified melt displacement out of the mold cavity through an overflow port (as taught by Weber), permitting therefore greater control of nominal lens thickness and so eliminating material scrap waste and trimming operations (as required with Weber, for example).

The technical problems in the manufacture of ophthalmic lenses are quite significant. Prescription lenses must deal with the inherent differential-shrinkage caused by very thick and thin cross-sections within the same lens. Also, minus-powered lenses (having relatively flat front convex curve and relatively steeper back concave curve) must avoid melt knitlines or weldlines associated with edge gating Prescription lenses have, compared to disks, much lower aspect ratios (about 35:1) and lower projected area to clamp up (7 square inches for a typical lens vs 17.7 square inches for a typical optical disk). Also, an optical disk is formed between virtually identical planar mold cavity surfaces.

Compressive forces for such in-mold "auxiliary component" approaches are much less than are available through clamp-actuated coining, and this limitation is particularly troublesome for disks because of their projected area and the necessity for intimate contact between the melt and the stamper.

U.S. Pat. No. 4,828,769 discloses a method for injection molding articles, especially ophthalmic lens blanks, which method comprises forming a closed mold cavity for receiving plasticized resin without introducing significant back pressure therein, injecting into the closed mold cavity a mass of plasticized resin slightly larger than the mass of the article to be formed, applying a main clamp force of the injection molding equipment to reduce the volume of the closed mold cavity, thereby redistributing the resin contained within the cavity, and maintaining the applied main clamp force, thereby compressing the resin at least until the resin within the closed mold cavity solidifies. This one-step method is described as at least addressing some of the problems encountered in prior art injection molding processes when they had been attempted for use with ophthalmic lenses. These types of manufacturing processes have been used exclusively for the preparation of monofocal lenses or for separate lens elements (e.g., front and rear lens elements) that are bonded together to form multifocal ophthalmic lenses.

Composite eyeglass lenses have been formed by bonding together front and rear lenses, as suggested in U.S. Pat. No.

2,618,200. A device and method for accomplishing this has been suggested in U.S. Pat. No. 4,927,480. Generally, the bonding process involves placing a curable adhesive on the concave interface surface of the front lens; pressing the convex interface surface of the rear lens against the adhesive in the front lens, to spread the adhesive throughout the space between the two lenses; and curing the adhesive to bond the lenses together, forming a composite lens, which is then trimmed to fit within an eyeglass frame.

Even after individual lens blanks of good optical properties have been manufactured, it is equally important to form them into ophthalmic lenses for use by the customer. Segmented and progressive ophthalmic lenses must also be capable of construction from these lens elements. For example, U.S. Pat. Nos. 4.883,548; 4,867,553; and 4,645, 317 show the formation of laminated ophthalmic lenses from at least two separate lens elements which are selected from a reserve and then associated to match a particular description. The at least two lens elements are adhesively secured together, with a photosetting resin and photoinitiator suggested for the process (e.g., U.S. Pat. Nos. 4,883,548 and 4,867,553).

Especially when the desired composite lens includes a cylindrical component that must be properly oriented to correct for astigmatism and a bifocal or progressive focal region that must be properly positioned for reading purposes, the existing methods and equipment have fallen short of the desired optical accuracy. Existing laminating equipment, for example, does not readily accommodate eccentric positioning and bonding of the front and rear lenses, which can be necessary in some cases. Also, existing methods and equipment have been inconvenient to operate and have put the desirable accuracies beyond practical reach for some composite eyeglass lenses, U.S. Pat. No. 5,433,810 describes lamination or bonding, together of front and rear lenses to form a composite eyeglass lens to address these perceived problems Although the use of separate laminable lens elements has proven to be of significant commercial advantage and has achieved acceptance with opticians and users, there would still be advantages if a finished or semifinished multifocal lens could be manufactured in a single procedure. This has not been accomplished with polymeric lenses, especially with polycarbonate lenses by either injection molding processes or casting processes especially where thinner (and therefore lighter weight) lenses are desired. Another aspect of the technical reasons why molding and casting have been unable to provide multifocal lenses with moderate to thin lens thickness dimensions (e.g., 0.5 to less than 2.0 mm edges and 1.0 to 3.5 center thickness) is the effect of the geometry of the lens, When molding plus power ophthalmic lenses, typically approximately equal dimension 75–85 mm bowl diameters are used for the front and the rear curves. The larger bowl diameter directly results in a thicker lens as a result of the geometry of the curves of the two bowls. This results in a heavier (because it is thicker) and a less attractive lens (because of the greater visibility of the edge of the lens, even with polishing).

It would be desirable to provide an effective process for the manufacture of finished or semifinished multifocal ophthalmic lenses with a single lens manufacturing step.

SUMMARY OF THE INVENTION

A process for the manufacture of multifocal ophthalmic lenses is provided for both injection molding and casting methodologies. The use of two opposed tools (mold faces) with relatively centered faces, but with significantly differing diameters can be used to provide multifocal ophthalmic lenses. The process is surprisingly capable of providing multifocal lenses with good control of the thickness of the lenses, with relatively thin center thicknesses (e.g., less than 3.5 mm) and relatively thin edge thicknesses (e.g., 0.5 to 2.0 mm). The tool faces (the molds for the front and rear surfaces) may be readily replaced within the mold to enable manufacture of a wide range of lens prescriptions with minimum down time.

DETAILED DESCRIPTION OF THE INVENTION

Figure 1:
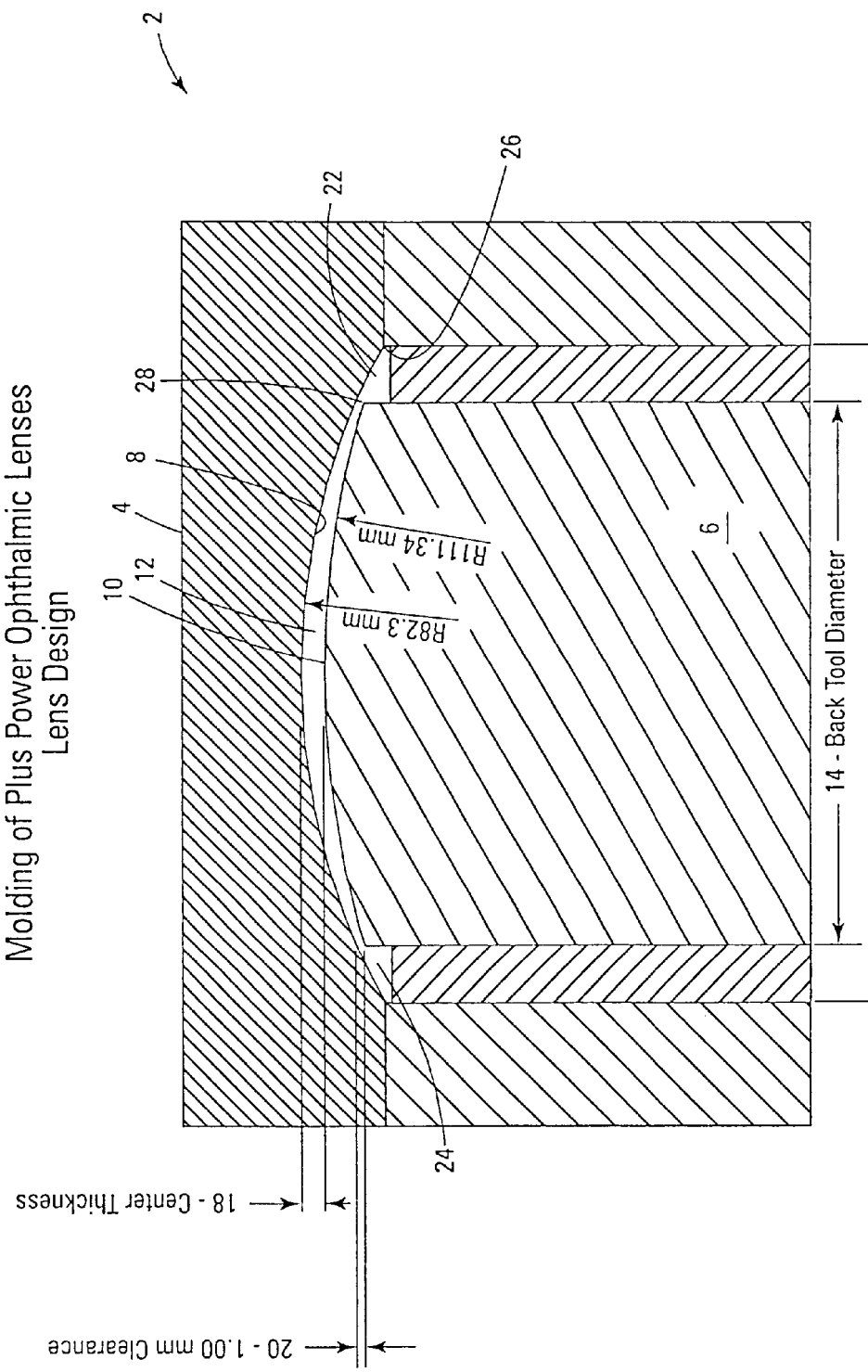
FIG. 1 shows a cross-section of a diagram representation of two mold faces used to manufacture plus power ophthalmic lenses according to the present invention.

The use of polymeric compositions in the manufacture of ophthalmic lenses has always held the potential for simple manufacturing processes that can rapidly produce prescription ophthalmic elements in a single manufacturing step from a raw stock material (the polymeric composition). This potential has heretofore been met only with single power ophthalmic lenses because of the numerous technical issues previously discussed. The potential has been extended to the manufacture of plus power lenses, multifocal lenses, bifocal lenses, and progressive lenses by the practice of the present invention. Even more importantly the novel process of the invention enables the single step manufacture of finished or semifinished multifocal lenses with the desirable physical attribute of light weight and good edge aesthetics because of the actual ability to manufacture lenses with relatively thin maximum thicknesses (e.g., less than 3.5 mm, less than 3.3 mm, less than 3.0 mm, less than 2.8 mm, less than 2.6 mm, and less than 2.5 mm) and relatively thin minimum thicknesses (e.g., between 0.5 mm and 2.5 mm, between 0.5 mm and 2.0 mm, between 0.5 mm and 1.5 mm, and between 0.5 and 1.0 mm, or less than any of the maximum thicknesses of these ranges). This is a significant technical achievement, enabling manufacture of ranges of finished or semifinished lens thicknesses in a single step manufacturing process that could not be heretofore achieved by existing ophthalmic lens manufacturing technology.

The process of the present invention includes the use of two opposing molding faces of differing molding face diameters. The molding, faces (the surfaces of the mold faces that are intended to come into direct contact with the moldable material and shape the intended article) should have diameters that differ by at least 5% (e.g., at least 2.5% along each radius from a common axis center), at least 7%, at least 10%, at least 13%, at least 15% or at least 20%. The back tool (the mold face that shapes the concave back surface of the lens) should be the smaller diameter lens mold. The front tool (the mold face that shapes the convex front surface of the lens) should be the larger diameter lens mold. This seemingly modest technical alteration from existing systems provides a unique advantage to the operation of the system and for the first time enables manufacture of multifocal lenses with excellent thickness control across the entire diameter of the lens. This can be readily seen by reference to the figures.

A general method according to the practice of the invention could include a process for forming a multifocal lens comprising:
a) providing a pair of shaping faces with a hardenable polymeric composition between the pair of shaping faces,
b) a first shaping face of the pair of shaping faces having a convex shaping face that is positioned towards a second shaping face of the pair of shaping faces,
c) the second shaping face having a concave shaping face,
d) each of said shaping faces having a diameter across the shaping face,
e) the diameter of the first shaping face being at least 5% less than the diameter of the second shaping face,
f) positioning the convex shaping face of the first shaping face at a position within the concave shaping face so that neither shaping face is in contact with the other shaping face, yet outer edges of the second shaping face extend from a position in front of the front surface of the first shaping face to a position beyond and behind outer edges of the first shaping face in two dimensions, and
g) hardening said hardenable polymeric composition.

The multifocal lens may be a bifocal lens, trifocal lens, or continuous lens with multiple focal powers as is understood in the art. The convex shaping face forms the rear concave surface of the multifocal lens, while the concave shaping face forms the front convex surface of the multifocal lens. In a normal ophthalmic construction, the concave surface of the lens would be closest to the eye (and is referred to as the rear surface of the multifocal lens) and the convex surface of the lens would face away from the wearer (and would be called the front surface of the multifocal lens). The "diameter" as used in this context of the invention refers to the straight-line widest dimension across the surface of the mold that actually contacts the hardenable polymeric composition within the mold. This may also be referred to as the inside dimension for the concave shaping face and the outside diameter for the convex shaping face. The outside diameter of the convex shaping face mold must be smaller than the inside diameter of the shaping face of the concave shaping face so that the convex shaping face may relatively nest within the volume inscribed by the volume within the concave shaping face of the forward mold surface or mold inset. It is because of this relative relationship that the convex shaping face of the first shaping mold inset or mold surface can be placed at a position within the concave shaping face (of the front mold surface) so that neither shaping face is in contact with the other shaping face. While in this position, the outer edges of the second shaping face extend from a position in front of the front surface of the first shaping face to a position beyond (wider than, with a greater diameter) and behind (more rearward than) outer edges of the first shaping surface in two dimensions. The relative position need only be behind the outer edges of the shaping surface, not behind the entire mold element that has the shaping surface on it. The actual method of forming the lens between the two shaping surfaces may comprise molding (e.g., injection molding, coining, etc.) or casting, the main difference being the level of pressure used between the opposed shaping faces and the nature of relative movement between the two shaping surfaces. The hardenable composition may comprise any polymeric material that provides the necessary optical properties, and may be a thermoplastic or thermoset polymer and is preferably according to modern manufacturing standards a polycarbonate resin. The moldable or castable resins must each have the necessary optical properties required for ophthalmic lenses.

The finished ophthalmic lens that is produced may comprise a continuous finished or semifinished polymeric composition multifocal lens having an edge having a thickness of 0.5 to 2.0 mm and a center thickness of less than 4.7 mm, less than 4.2 mm, less than 4.0 mm, less than 3.8 mm, or less than 3.5 mm. The continuous polymeric composition multifocal lens product of the present invention has a unique structure with a ridge surrounding the lens that has a thickness at least two times the thickness of the thinnest dimension of the lens. The ridge will have a relatively convex forward surface (corresponding to the shape of the outer regions of the concave shaping face), but the relatively rearword surface of the ridge will not necessarily have a shape with any conformation to the surface of the convex shaping face. This is because the rear surface does not actually form against the convex shaping face but may be formed within an adjacent cavity, such as an overflow zone adjacent to the convex shaping face surface. The lens may comprise a molded lens or a cast lens. The actual lens surface may have edge thickness is between 0.5 and 2.5 mm. or between 0.5 and 1.5 mm. The lens may have, for example, a center thickness is less than 4.7 mm, or the other dimensions described above.

FIG. 1 shows a diagram of a mold system 2 comprising a front tool 4 and a back tool 6. The interior surface 8 of the front tool 4 shapes the exterior front curvature of the multifocal lens (not shown) that would be formed within the cavity 10. That cavity 10 is formed between the interior surface 8 of the front tool 4 and the interior or forward surface 12 of the rear tool 6. The interior surface 12 of the rear tool 6 shapes the concave surface of the lens (not shown) formed within the cavity 10. It can be seen from FIG. 1 that the diameter 14 of the back tool 6 is smaller than the diameter 16 of the front tool 4. This provides dynamic effects upon the molding process.

The configuration of nesting back tool 6 in receiving front tool 4 enables minimization of the center thickness 18 of the lens forming cavity 10 while at the same time maintain a workable, yet thin clearance 20 that establishes the approximately thinnest dimension in the lens forming cavity 10. Ridge forming zones 22 and 24 are also conveniently provided by this configuration of lenses, moldable material from the lens forming, process filling these ridge forming zones 22 and 24 in regions that are ordinarily removed during the fitting of the lens to a frame. The relative progression between the two molding surfaces 8 and 12 is controlled, usually by positioning of the back tool 6 (with a diameter of 65 mm shown) so that the desired clearance 20 is maintained at the desired dimension (e.g., between 0.5 and 2.5 mm) while minimizing the center thickness 18 possible for the prescription. In the mold system 2 shown, the approximate radius of curvature of the mold surface 12 of the back tool 6 is shown as 111.34 mm while the approximate radius of curvature of the mold surface 8 of the front tool 4 (with a diameter of 80 mm shown) is shown as 82.3 mm. This combination in the practice of the present invention provides a potential and easily achievable combination of a 1.0 mm clearance 20 and a maximum center thickness 18 of 2.84 mm. This will be seen to be a remarkable difference from the optimum capability of the systems of the prior art with essentially equal mold face diameters.

Figure 2:
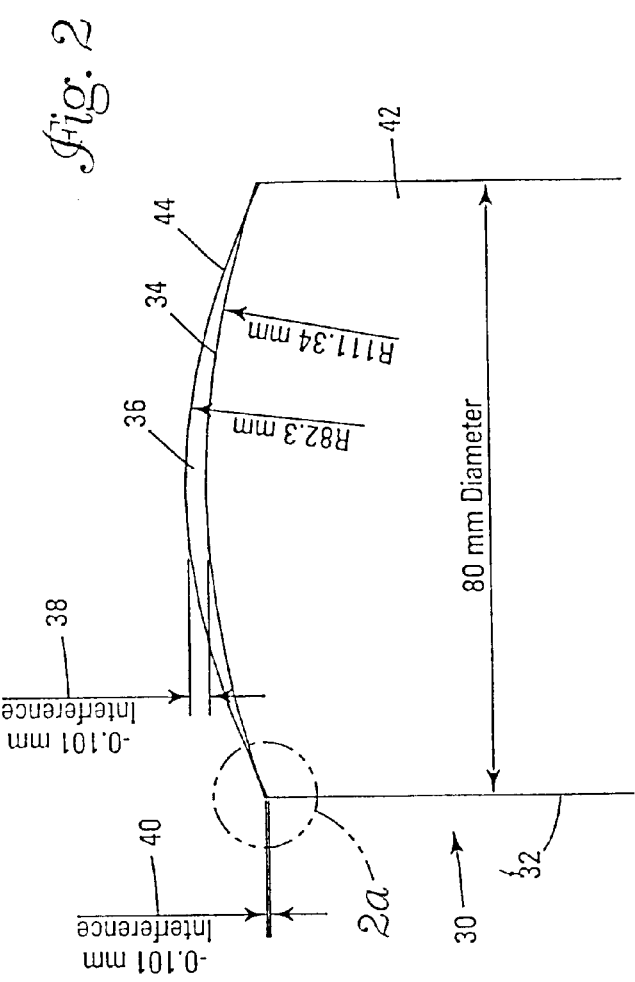
FIG. 2 shows an attempt to manufacture plus power ophthalmic lenses with a traditional equal diameter set of matching mold faces.
Figure 2A:
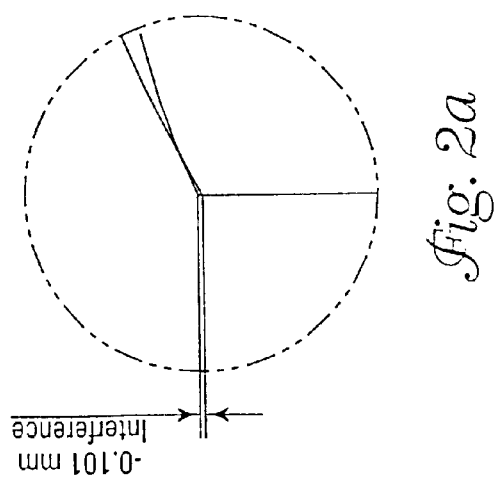

FIG. 2 shows a mold system 30 with coincident diameter (equal diameters of 80 mm) mold faces 34 and 36. Again, the approximate radius of the mold surface 34 of the back tool 42 is shown as 111.34 mm while the approximate radius of the mold surface 36 of the front tool 44 is shown as 82.3 mm. This configuration, with equal mold diameter faces could produce a center thickness 38 of 2.84 mm only when the "clearance" 40 is −0.101 mm. That is, the edges of the mold faces 34 and 36 would have to occupy the same volume of space, which is of course an impossibility. The mold configuration of the prior art is therefore incapable of producing the same finished or semifinished multifocal lens dimensions easily provided by the practice of the present invention.

Figure 3:
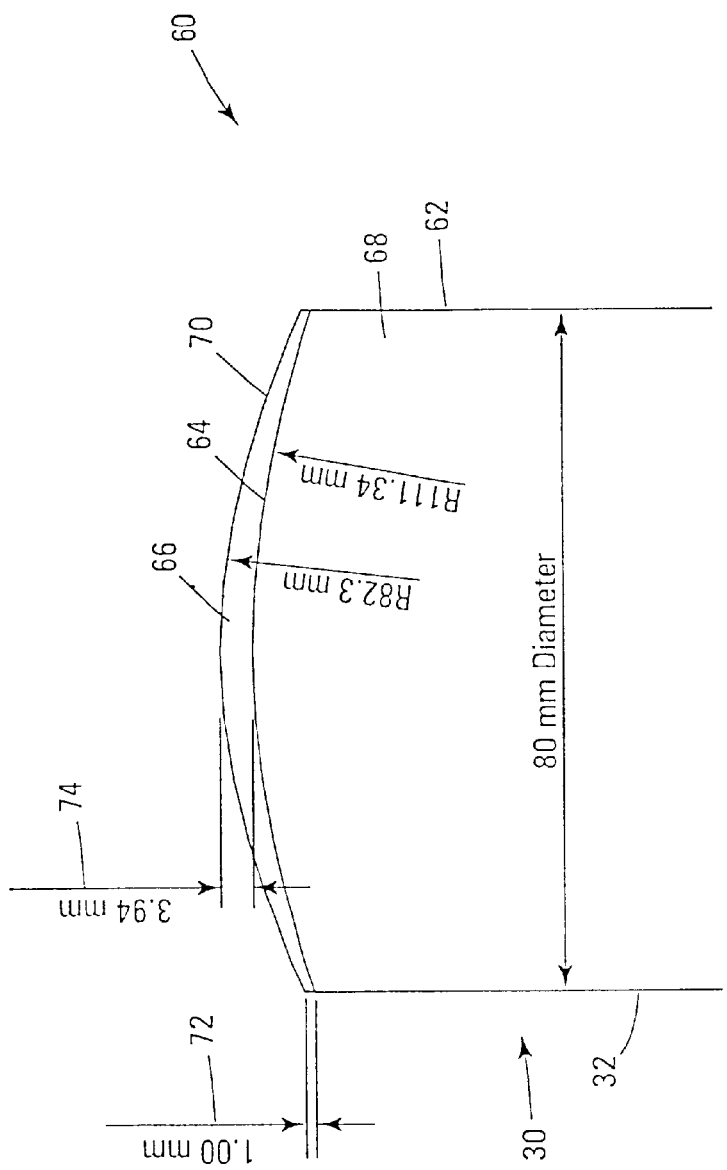
FIG. 3 shows the effect of attempting to offset lens faces in the manufacture of plus power ophthalmic lenses with a traditional equal diameter set of matching mold faces.

FIG. 3 shows the obvious methodology for attempting, to provide the required or desired dimensions described in the practice of the invention in FIG. 1. A mold system 60 that is substantially identical to that of FIG. 2 is shown, but with the clearance 72 set at the desired dimension of 1.0 mm. Again, with coincident diameters (80 mm) for the mold faces 64 and 66, the approximate radius of the mold surface 64 of the back tool 68 is shown as 111.34 mm while the approximate radius of the mold surface 66 of the front tool 70 is shown as 82.3 mm. Although the clearance 72 in this setting of a prior art-type mold is now 1.0 mm, the center thickness 74 is now 3.94 mm. This is more than a 30% increase in this dimension. The lens produced by this procedure would be much thicker in the center of the lens and would weigh significantly more than the lens produced according to the mold system shown in FIG. 1 according to the teachings of the present invention. Not only does this procedure save material costs (by an average of at least 10% by weight), but it also produces a more aesthetically thin center thickness and lighter weight lens.

This process may be described as a method for forming a multifocal lens comprising providing a pair of shaping faces with a hardenable polymeric composition (e.g., thermally softenable and thus re-hardenable, polymerizable, photopolymerizable, etc.) between the pair of shaping faces, a first shaping face of the pair of shaping faces having a convex shaping face (the rear tool molding or casting face) that is positioned towards a second shaping face of the pair of shaping faces, the second shaping face (the front tool molding or casting face) having a concave shaping face, each of said shaping faces having a diameter across the shaping face, the diameter of the first shaping face being at least 5% less than the diameter of the second shaping face, positioning the convex shaping face of the first shaping face at a position within the concave shaping face so that neither shaping face is in contact with the other shaping face, yet outer edges of the second shaping face extend from the front surface of the first shaping face to a position beyond outer edges of the first shaping face in two dimensions (that means that although the center of the front tool shaping face is relatively forward of the center of the shaping face of the rear tool, the outer edges of the front tool shaping face pass outside of the diameter of the rear shaping, face [a first dimension] and then pass rearward of the edge of the rear shaping face [see FIG. 1 where the edge 26 of the front shaping face 8 extends relatively rearward of the edge 28 of the rear shaping face 12], and hardening said hardenable polymeric composition to form the multifocal lens.

This technology can be used with any commercially feasible molding or casting resin. This type of system can be readily seen to be useful with both casting and molding systems, the main difference being that in cast systems, the force provided by the rear mold surface and the pressures in the composition would tend to be significantly less than those produced in a typical molding operation, such as those described in the prior art.

What is claimed:

1. A method for forming a multifocal lens comprising providing a pair of shaping faces with a hardenable polymeric composition between the pair of shaping faces, a first shaping face of the pair of shaping faces having a convex shaping face that is positioned towards a second shaping face of the pair of shaping faces, the second shaping face having a concave shaping face, each of said shaping faces having a diameter across the shaping face, the diameter of the first shaping face being at least 5% less than the diameter of the second shaping face, positioning the convex shaping face of the first shaping face at a position within the concave shaping face so that neither shaping face is in contact with the other shaping face, yet outer edges of the second shaping face extend from a position in front of the front surface of the first shaping face to a position beyond and behind outer edges of the first shaping face in two dimensions, and hardening said hardenable polymeric composition.

2. The method of claim 1 wherein said method of forming comprises molding.

3. The method of claim 1 wherein said method of forming comprises casting.

4. The method of claim 1 wherein said method of forming comprises injection molding.

5. The method of claim 1 wherein said hardenable composition comprises polycarbonate resin.

6. The method of claim 2 wherein said hardenable composition comprises polycarbonate resin.

7. The method of claim 3 wherein said hardenable composition comprises a castable polymeric composition.

8. The method of claim 4 wherein said hardenable composition comprises polycarbonate resin.

9. The method of claim 1 wherein a finished ophthalmic lens is produced comprising a continuous finished or semi-finished polymeric composition multifocal lens having an edge having a thickness of 0.5 to 2.0 mm and a center thickness of less than 4.7 mm.

10. A continuous polymeric composition multifocal lens having a ridge surrounding the lens that has a thickness at least two times the thickness of the thinnest dimension of the lens.

11. A continuous finished or semifinished polymeric composition multifocal lens having an edge having a thickness of 0.5 to 2.0 mm and a center thickness of less than 4.7 mm.

12. The lens of claim 11 comprising a molded lens.

13. The lens of claim 12 comprising a cast lens.

14. The lens of claim 12 wherein said edge thickness is between 0.5 and 1.5 mm.

15. The lens of claim 13 wherein said edge thickness is between 0.5 and 1.5 mm.

16. The lens of claim 14 wherein the center thickness is less than 4.7 mm.

17. The lens of claim 15 wherein the center thickness is less than 4.7 mm.

* * * * *